United States Patent
Shahar et al.

(10) Patent No.: US 9,996,498 B2
(45) Date of Patent: Jun. 12, 2018

(54) NETWORK MEMORY

(71) Applicant: MELLANOX TECHNOLOGIES LTD., Yokneam (IL)

(72) Inventors: Ariel Shahar, Jerusalem (IL); Maria Lubeznov, Yokneam Ilit (IL)

(73) Assignee: Mellanox Technologies, Ltd., Yokneam (IL)

( * ) Notice: Subject to any disclaimer, the term of this patent is extended or adjusted under 35 U.S.C. 154(b) by 293 days.

(21) Appl. No.: 14/847,021

(22) Filed: Sep. 8, 2015

(65) Prior Publication Data

US 2017/0068640 A1   Mar. 9, 2017

(51) Int. Cl.
| | |
|---|---|
| *G06F 15/167* | (2006.01) |
| *G06F 15/173* | (2006.01) |
| *H04L 29/08* | (2006.01) |
| *H04L 12/861* | (2013.01) |
| *H04L 12/933* | (2013.01) |

(52) U.S. Cl.
CPC ........ *G06F 15/17331* (2013.01); *H04L 49/15* (2013.01); *H04L 49/9068* (2013.01); *H04L 67/1097* (2013.01)

(58) Field of Classification Search
CPC ......... H04L 67/1097; H04L 12/120009; H04L 63/08; H04L 41/00; H04L 49/9068
USPC ........................................................ 709/212
See application file for complete search history.

(56) References Cited

U.S. PATENT DOCUMENTS

| | | | |
|---|---|---|---|
| 8,051,212 B2 * | 11/2011 | Kagan ................. | G06F 13/1605 709/249 |
| 8,082,400 B1 | 12/2011 | Chang et al. | |
| 8,266,238 B2 | 9/2012 | Zimmer et al. | |
| 8,433,770 B2 | 4/2013 | Noya et al. | |
| 8,917,595 B2 | 12/2014 | Shah et al. | |
| 2004/0073716 A1 | 4/2004 | Boom et al. | |
| 2007/0283054 A1 | 12/2007 | Burton | |
| 2008/0016269 A1 | 1/2008 | Chow et al. | |
| 2011/0029650 A1 | 2/2011 | Shah | |
| 2011/0246597 A1 | 10/2011 | Swanson et al. | |
| 2011/0289179 A1 | 11/2011 | Pekcan et al. | |
| 2011/0295967 A1 | 12/2011 | Wang et al. | |
| 2012/0030408 A1 * | 2/2012 | Flynn .................. | G06F 12/0246 711/102 |

(Continued)

OTHER PUBLICATIONS

U.S. Appl. No. 14/033,470 Office Action dated Feb. 18, 2016.

(Continued)

*Primary Examiner* — Wing F Chan
*Assistant Examiner* — Andrew Woo
(74) *Attorney, Agent, or Firm* — D. Kligler IP Services Ltd.

(57) ABSTRACT

Communication apparatus includes a host interface for connection, via a host bus, to a host processor and a host memory, which is mapped to an address space of the host bus, and a network interface, configured to transmit and receive packets over a network. A local memory is configured to hold data in a memory space that is not mapped to the address space of the host bus. Packet processing circuitry, which is connected between the host interface and the network interface and is connected to the local memory, is configured to receive from the network interface a packet carrying a remote direct memory access (RDMA) request that is directed to an address in the local memory, and to service the RDMA request by accessing the data in the local memory.

18 Claims, 2 Drawing Sheets

(56) References Cited

U.S. PATENT DOCUMENTS

| | | |
|---|---|---|
| 2013/0179722 A1 | 7/2013 | Smith et al. |
| 2013/0227190 A1 | 8/2013 | Berte |
| 2014/0047156 A1 | 2/2014 | Billi |
| 2014/0089631 A1 | 3/2014 | King |
| 2014/0095753 A1 | 4/2014 | Crupnicoff et al. |
| 2014/0173154 A1 | 6/2014 | Sunkavalli et al. |
| 2015/0212817 A1 | 7/2015 | Raikin et al. |
| 2015/0293881 A1 | 10/2015 | Raikin et al. |

OTHER PUBLICATIONS

InfiniBand Trade Association, "InfiniBandTM Architecture Specification", vol. 1, Release 1.2.1, 1727 pages, Nov. 2007.
Liang et al., "Swapping to Remote Memory over InfiniBand: An Approach using a High Performance Network Block Device", IEEE International Conference on Cluster Computing (Cluster 2005), 10 pages, Sep. 2005.
Choi et al., "A Remote Memory System for High Performance Data Processing", International Journal of Future Computer and Communication, vol. 4, No. 1, pp. 50-54, Feb. 2015.
Liang et al., "Exploiting Remote Memory in InfiniBand Clusters using a High Performance Network Block Device (HPBD)", Technical Report OSU-CISRC-5/05-TR36, 11 pages, Jun. 13, 2005.
Redhat, "Overcommitting with KVM", Chapter 7, 3 pages, 2015 https://access.redhat.com/site/documentation/en-US/
Red_Hat_Enterprise_Linux/6/html/
Virtualization_Administration_Guide/chap-Virtualization-
Tips_and_tricks-Overcommitting_with_KVM.html.
U.S. Appl. No. 15/181,436, filed Sep. 19, 2017.

* cited by examiner

NETWORK MEMORY

FIELD OF THE INVENTION

The present invention relates generally to data network communications, and particularly to network interface controllers.

BACKGROUND

In some data networks, such as InfiniBand and Data Center Ethernet, network interface controllers (NICs) can be configured to exchange data between network nodes by remote direct memory access (RDMA). RDMA requests transmitted by an initiating node specify an address in the host memory of the responding node to which the NIC is to write data or from which the NIC is to read data. RDMA write requests cause the responder to write data to a memory address at its own end of the link, whereas RDMA read requests cause the responder to read data from a memory address and return it to the requester. The responding NIC carries out these write and read operations to and from the host memory without direct involvement by the host processor of the responding node. Software applications running on the host processor are likewise able to access the data in the host memory.

Separate and apart from the host memory, the NIC may have its own memory. For example, U.S. Patent Application Publication 2011/0029650 describes a method and system for host independent platform diagnostics in which a network controller may comprise a NIC, and a network memory may comprise suitable logic, circuitry, interfaces, and/or code that may enable buffering, storage and/or retrieval of data and/or code used and/or processed by the network controller. As another example, U.S. Patent Application Publication 2014/0173154 describes a network interface with logging, in which a NIC is configured to receive data, to transmit data, and to send data for logging, and a memory log, comprising non-volatile memory (NVM) coupled to the NIC, is configured to write the data sent for logging from the NIC. As a further example, U.S. Pat. No. 8,051,212 describes a network interface adapter, which holds a response database (RDB) in an off-chip memory, which is accessed using a double-data-rate memory controller, rather than via the system bus. Additionally or alternatively, the RDB may be held in system memory.

SUMMARY

Embodiments of the present invention that are described hereinbelow provide apparatus and methods enabling more efficient data access by a NIC.

There is therefore provided, in accordance with an embodiment of the invention, communication apparatus, including a host interface for connection, via a host bus, to a host processor and a host memory, which is mapped to an address space of the host bus, and a network interface, configured to transmit and receive packets over a network. A local memory is configured to hold data in a memory space that is not mapped to the address space of the host bus. Packet processing circuitry, which is connected between the host interface and the network interface and is connected to the local memory, is configured to receive from the network interface a packet carrying a remote direct memory access (RDMA) request that is directed to an address in the local memory, and to service the RDMA request by accessing the data in the local memory.

In the disclosed embodiments, the packet processing circuitry is configured to direct the RDMA request to the local memory responsively to a modifier associated with the address in the local memory. In some embodiments, the RDMA request includes a memory key, and the packet processing circuitry is configured to associate the memory key with the modifier and to direct the RDMA request to the local memory responsively to the memory key associated with the modifier. Additionally or alternatively, the packet processing circuitry is configured to service RDMA requests specifying addresses that do not have the modifier associated therewith by accessing the specified addresses in the host memory via the host bus.

Typically, the local memory is not configured as a cache of the host memory. In some embodiments, the local memory has a given physical size, and the packet processing circuitry is configured to present an effective size of the local memory that is larger than the physical size by backing-up unused data from the local memory in the host memory. Additionally or alternatively, the packet processing circuitry is implemented in a first integrated circuit chip, and the local memory includes a second integrated circuit chip, which is separate from and connected to the first integrated circuit chip.

Typically, the local memory is configured to service the RDMA request without generating a bus transaction on the host bus. In a disclosed embodiment, the data in the local memory include a semaphore, which is accessed by other nodes on the network by directing RDMA requests to the address in the local memory.

In one embodiment, the RDMA request includes an RDMA write request, and the packet processing circuitry is configured to service the RDMA write request by writing the data to the address in the local memory. Additionally or alternatively, the RDMA request includes an RDMA read request, and the packet processing circuitry is configured to service the RDMA read request by reading the data from the address in the local memory and transmitting a packet containing the data to an initiator of the RDMA read request. Further additionally or alternatively, the RDMA request includes an RDMA atomic read-modify-write request, and the packet processing circuitry is configured to service the RDMA atomic read-modify-write request by modifying the data at the address in the local memory.

There is also provided, in accordance with an embodiment of the invention, a method for communication, including, in a network interface controller (NIC), which is connected via a host bus to a host processor and a host memory, which is mapped to an address space of the host bus, storing data in a local memory of the NIC in a memory space that is not mapped to the address space of the host bus. Upon receiving in the NIC, from a network, a packet carrying a remote direct memory access (RDMA) request that is directed to an address in the local memory, the RDMA request is serviced in the NIC by accessing the data in the local memory.

The present invention will be more fully understood from the following detailed description of the embodiments thereof, taken together with the drawings in which:

DETAILED DESCRIPTION OF EMBODIMENTS

In computer systems that are known in the art, RDMA operations are always directed through the NIC to addresses in the host memory (also referred to as the main memory or system memory). These host memory addresses are mapped in the address space of the host bus, such as a PCI Express® bus, and are thus accessible to both the NIC (possibly after a translation of the RDMA address specified in the packet to a corresponding address on the bus) and to applications and other software running on the host processor. This model of memory management is useful in most cases for just this reason: It makes the data accessible both to application processes running on the host computer and to peer processes running on other nodes of the network. On the other hand, however, frequent accesses to the host memory by the NIC in servicing RDMA requests consume bandwidth on the host bus and can also increase the latency of bus transactions.

Embodiments of the present invention that are described herein address this problem by providing the NIC with a dedicated local memory, which is configured to hold data in a memory space that is not mapped to the address space of the host bus. Consequently, only the NIC is able to access this local memory space, and not the host processor. When the packet processing circuitry in the NIC receives an RDMA request that is directed to an address in the local memory, it is able to service the RDMA request by accessing the data in the local memory, without having to invoke a bus transaction or otherwise access the host memory. The local memory in this configuration is particularly useful for storing data (typically small quantities of data) that are used mainly by other network components, rather than the host computer to which the NIC is connected, such as semaphores that are accessed by remote nodes for purposes of synchronization and other memory blocks that are accessed by atomic read-modify-write access, such as global counters.

Figure 1:
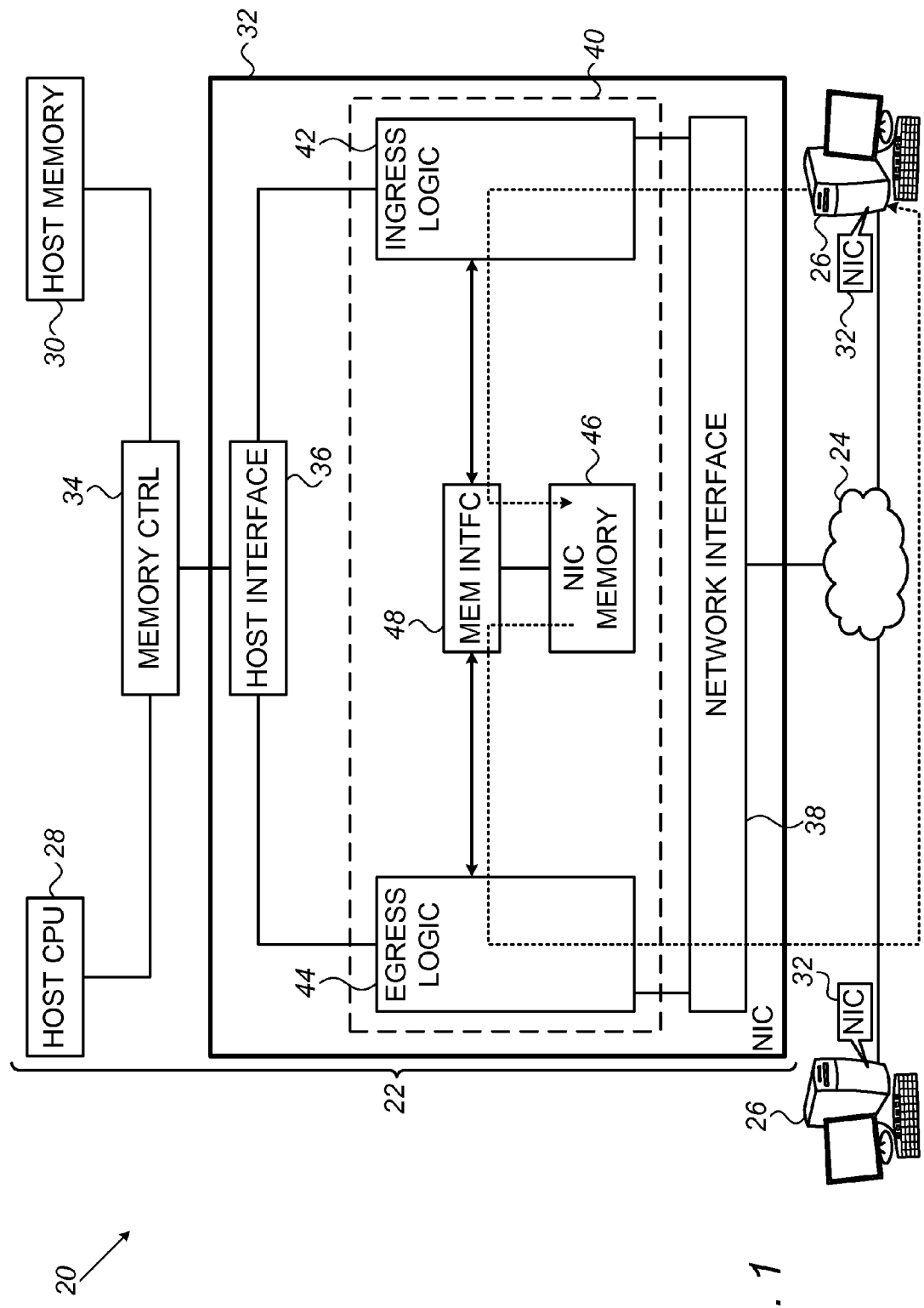
FIG. 1 is block diagram that schematically illustrates a computer system, in accordance with an embodiment of the invention.

FIG. 1 is a block diagram that schematically illustrates a computer system 20, in accordance with an embodiment of the invention. System 20 comprises a host computer 22, which is connected by a packet network 24, such as an InfiniBand or Ethernet network, to other network nodes 26. Although these other nodes 26 are pictured in FIG. 1 as host computers, as well, they may alternatively or additionally comprise computing and communication devices of other sorts, such as storage and other utility nodes, gateways, routers, and network appliances, for example, as are known in the art.

Host computer 22 comprises a host processor 28, also referred to as a central processing unit (CPU), and a host memory 30, typically comprising dynamic random access memory (DRAM), which is accessed via a memory controller 34, also referred to as a root complex. Some or all of the address space of memory 30 is mapped via controller 34 to a host bus, such as a PCI Express bus. A NIC 32 links computer 22 to network 24, via a network interface 38, which transmits and receives packets over the network via one or more ports. The NIC connects to the host bus via a host interface 36 (which is likewise mapped to the address space of the host bus), and is thus able to access data in memory 30. Typically, nodes 26 are similarly connected to network 24 by respective NICs 32, which may be of the same general configuration as the NIC in computer 22 or may be configured differently, depending on the requirements of the corresponding nodes.

Packet processing circuitry 40 in NIC 32 is connected between host interface 36 and network interface 38. In this simplified view, circuitry 40 comprises ingress logic 42, which handles incoming packets from network 24, and egress logic 44, which generates and transmits outgoing packets. Some of these outgoing packets are typically generated in response to work requests submitted by processes running on host processor 28, while others are generated autonomously by circuitry 40 in response to incoming packets from network 24. These generic functions of the ingress and egress logic and their implementation will be familiar to those skilled in the art and are beyond the scope of the present description. Typically, the functional elements of NIC 32 (interfaces 36 and 38 and circuitry 40) are implemented in hardware logic in one or more integrated circuit chips. Alternatively or additionally, at least some of the functions of NIC 32 may be carried out in software on a programmable processor, either embedded or standalone.

Ingress logic 42 and egress logic 44 are connected by a memory interface 48 to a local memory 46, also referred to as the NIC memory (to distinguish it from host memory 30). Local memory 46 typically comprises either DRAM or static RAM (SRAM) and may be implemented either as an embedded memory array within one of the integrated circuit chips of NIC 32 or as a separate chip. In either case, however, memory 46 is not mapped to the address space of the host bus and thus is not accessible to processes running on CPU 28 except, possibly, via NIC 32. Although in some cases, some of the data in local memory 46 of NIC 32 may be duplicated in host memory 30, local memory 46 has its own, independent address space and is not configured as a cache of the host memory. In other embodiments, the on-chip memory that is accessible as local memory 46 can be physically small, while presenting a larger effective size by backing-up unused data from the local memory in host memory 30, in locations that are determined by memory interface 48.

The address space of local memory 46 can be distinguished from that of host memory 30 by addition of a modifier, for example a bit or group of bits that are added to addresses used by NIC 32 and have one value for local memory 46 and a different value for host memory 30. When the modifier is set to "internal" (or equivalently, "local") in a data transaction handled by packet processing circuitry 40, the corresponding memory access operation is referred to memory interface 48, which then reads writes data to or reads data from the specified address in local memory 46. Otherwise, the memory access operation is directed via host interface 36 to the appropriate address in host memory 30. Decoding of the address modifier may be performed, for example, by a memory protection and translation module (not shown) in NIC 32, which is also responsible for other address translation functions, such as translating between virtual and physical addresses in memory 30. Alternatively, the modifier may be determined according to a context that is indexed by the Memory-Key IDs that are carried in the RDMA requests.

Software operating the NIC 32 informs other nodes 26 on network 24 of relevant data, such as semaphores, that are held in local memory 46, and furnishes the other nodes with the corresponding addresses of the data in the local memory, including the modifier. The other nodes need not be aware of the special meaning of the modifier and may simply treat it as a part of the address or the Memory Key to use. Thus, in the example shown in FIG. 1, node 26 is able to direct an RDMA request packet to NIC 32 of host computer 22, specifying such an address in local memory 46. The packet is conveyed via network interface 38 to packet processing circuitry 40, which accesses the data in local memory 46 accordingly. In the case of an RDMA write request, ingress logic 42 will write data to the specified address in memory 46, whereas an RDMA read request will cause egress logic to read the data from the specified address and insert it in an RDMA read response packet to node 26. In the case of an Atomic Read-Modify-Write request, data will be atomically modified in the local memory, and the original data may be returned in response to the request.

Figure 2:
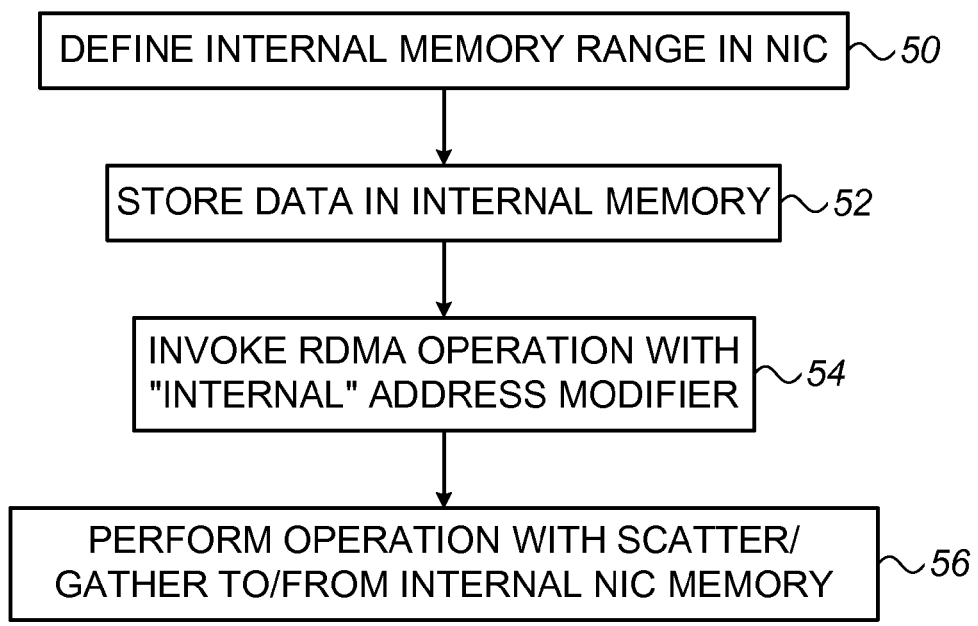
FIG. 2 is a flow chart, which schematically illustrates a method for memory access, in accordance with an embodiment of the invention.

FIG. 2 is a flow chart, which schematically illustrates a method for access to a local memory in a NIC, in accordance with an embodiment of the invention. The method is described here, for the sake of clarity and concreteness, with reference to the architecture of NIC 32 that is shown in FIG. 1. Alternatively, however, the principles of this method may be implemented in other architectural configurations, as will be apparent to those skilled in the art after reading the present description. All such implementations are considered to be within the scope of the present invention.

To use the method of FIG. 2, an internal memory address range is defined within NIC 32, for assignment to local memory 46, at a memory definition step 50. As explained earlier, this internal, local address range is distinct from the address range of host memory 30 and is not mapped to the address space of the host bus. NIC 32 stores data in local memory 46, at a data storage step 52. The data may be written to local memory 46 only through the NIC, either by driver software running on host processor 28, for example, or by RDMA from another node 26. Memory 46 may be used to store substantially any sort of data, but it is particularly useful for holding data structures, such as semaphores, that are shared among other nodes 26 over network 24 but are not generally needed by applications running on host processor 28. Consequently, the other nodes may access these data structures via network 24 with low latency and without loading the host bus of computer 22.

To access local memory 46, other nodes 26 invoke RDMA operations by NIC 32 of host computer 22 by including the "internal" modifier in the RDMA address, at an RDMA request step 54. In response to the request, NIC 32 carries out the RDMA operation by accessing the specified address in memory 46, at a local memory access step 56. For example, as noted above, packet processing circuitry 40 will scatter data to memory 46 in the case of an RDMA write request, or will gather data from memory 46 in order to service an RDMA read request. Other RDMA requests, without the "internal" modifier, are handled by accessing host memory 30 in the conventional manner.

Although the embodiments described above relate particularly to the use of local memory 46 in RDMA operations, NIC 32 may also gather data itself from the local memory in order to send it to the network. This feature can be useful, for example, when the NIC is required to send multiple copies of the same data to different recipients, and can thus avoid fetching the data repeatedly from the host memory by reading the data from the local memory.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface controller communication apparatus, comprising:
    a host interface for connection, via a host bus, to a host processor and a host memory, which is mapped to an address space of the host bus;
    a network interface, configured to transmit and receive packets over a network;
    a local memory, which is configured to hold data in a memory space that is not mapped to the address space of the host bus; and
    packet processing circuitry, which is connected between the host interface and the network interface and is connected to the local memory, through a path not including the host bus, and which is configured to receive from the network interface a packet carrying a remote direct memory access (RDMA) request that is directed to an address in the local memory, and to service the RDMA request by accessing data addressed by the RDMA request, in the local memory, without invoking a transmission of data over the host bus,
    wherein the packet processing circuitry is configured to determine an address modifier of received RDMA requests, to service RDMA requests for which the address modifier indicates local service, by accessing the local memory and to service RDMA requests for which the address modifier does not indicate the local service, by accessing the host memory via the host bus.

2. The apparatus according to claim 1, wherein the RDMA request comprises a memory key, and wherein the packet processing circuitry is configured to associate the memory key with the address modifier and to direct the RDMA request to the local memory responsively to the memory key associated with the address modifier.

3. The apparatus according to claim 1, wherein the local memory is not configured as a cache of the host memory.

4. The apparatus according to claim 1, wherein the local memory has a given physical size, and wherein the packet processing circuitry is configured to present an effective size of the local memory that is larger than the physical size by backing-up unused data from the local memory in the host memory.

5. The apparatus according to claim 1, wherein the packet processing circuitry is implemented in a first integrated circuit chip, and the local memory comprises a second integrated circuit chip, which is separate from and connected to the first integrated circuit chip.

6. The apparatus according to claim 1, wherein the data in the local memory comprise a semaphore, which is accessed by other nodes on the network by directing the RDMA requests to the address in the local memory.

7. The apparatus according to claim 1, wherein the RDMA request comprises an RDMA write request, and wherein the packet processing circuitry is configured to service the RDMA write request by writing the data to the address in the local memory.

8. The apparatus according to claim 1, wherein the RDMA request comprises an RDMA read request, and wherein the packet processing circuitry is configured to service the RDMA read request by reading the data from the address in the local memory and transmitting a packet containing the data to an initiator of the RDMA read request.

9. The apparatus according to claim 1, wherein the RDMA request comprises an RDMA atomic read-modify-write request, and wherein the packet processing circuitry is configured to service the RDMA atomic read-modify-write request by modifying the data at the address in the local memory.

10. The method for communication, comprising:
in a network interface controller (NIC), which is connected via a host bus to a host processor and a host memory, which is mapped to an address space of the host bus, storing data in a local memory of the NIC in a memory space that is not mapped to the address space of the host bus;
receiving in the NIC, from a network, a packet carrying a remote direct memory access (RDMA) request that is directed to an address;
determining in the NIC an address modifier of the address in the received RDMA request; and
servicing the RDMA request in the NIC by accessing data addressed by the RDMA request, in the local memory, without invoking a transmission of data over the host bus, if the address modifier indicates local service, and servicing the RDMA request by accessing the host memory via the host bus, if the address modifier does not indicate the local service.

11. The method according to claim 10, wherein the RDMA request comprises a memory key, which is associated with the address modifier, and wherein accessing the local memory comprises directing the RDMA request to the local memory responsively to the memory key associated with the address modifier.

12. The method according to claim 10, wherein the local memory is not configured as a cache of the host memory.

13. The method according to claim 10, wherein the local memory has a given physical size, and wherein storing the data in the local memory comprises presenting an effective size of the local memory that is larger than the physical size by backing-up unused data from the local memory in the host memory.

14. The method according to claim 10, wherein the NIC is implemented in a first integrated circuit chip, and wherein storing the data in the local memory comprises storing the data in a second integrated circuit chip, which is separate from and connected to the first integrated circuit chip.

15. The method according to claim 10, wherein the data in the local memory comprise a semaphore, which is accessed by other nodes on the network by directing the RDMA requests to the address in the local memory.

16. The method according to claim 10, wherein the RDMA request comprises an RDMA write request, and wherein servicing the RDMA write request comprises writing the data to the address in the local memory.

17. The method according to claim 10, wherein the RDMA request comprises an RDMA read request, and wherein servicing the RDMA read request comprises reading the data from the address in the local memory and transmitting a packet containing the data to an initiator of the RDMA read request.

18. The method according to claim 10, wherein the RDMA request comprises an RDMA atomic read-modify-write request, and wherein servicing the RDMA atomic read-modify-write request comprises modifying the data at the address in the local memory.

* * * * *